United States Patent [19]

Kookootsedes

[11] Patent Number: 5,026,811
[45] Date of Patent: Jun. 25, 1991

[54] SILICONE RESIN THERMOSET MOLDING COMPOSITIONS

[75] Inventor: Gust J. Kookootsedes, Midland, Mich.

[73] Assignee: Dow Corning Corporation, Midland, Mich.

[21] Appl. No.: 481,086

[22] Filed: Feb. 16, 1990

[51] Int. Cl.$^5$ .............................................. C08G 77/06
[52] U.S. Cl. ........................................ 528/14; 528/21; 524/588
[58] Field of Search ...................... 524/588; 528/14, 21

[56] References Cited

U.S. PATENT DOCUMENTS

| | | | |
|---|---|---|---|
| 3,208,961 | 9/1965 | Kookootsedes | 260/18 |
| 4,102,941 | 7/1978 | LaRochelle | 528/21 |
| 4,272,415 | 6/1981 | Haman et al. | 528/14 |
| 4,376,178 | 3/1983 | Blount | 524/588 |

Primary Examiner—Paul R. Michl
Assistant Examiner—Karen A. Hellender
Attorney, Agent, or Firm—Roger H. Borrousch

[57] ABSTRACT

Silicone resin compositions useful as transfer molding resins are prepared by blending a siloxane resin, filler, and as a catalyst an alkali metal salt of a carboxylic acid, a combination of an alkali metal carbonate or bicarbonate and a carboxylic acid, or an alkali metal carbonate and an ammonium salt of a carboxylic acid.

25 Claims, No Drawings

SILICONE RESIN THERMOSET MOLDING COMPOSITIONS

BACKGROUND OF THE INVENTION

1. Field of the Invention

This invention relates to thermosetting silicone resin molding compositions. More particularly, this invention relates to silicone resin compositions adaptable to transfer molding techniques.

2. Background Information

Silicone resin molding compositions are prepared by blending a silicone resin, a filler, and a catalyst for curing the composition. Because silicone resins are generally hard and brittle at room temperature, it is necessary to heat the resin while the filler and catalyst are added and mixed to make the composition. The heated silicone resin becomes soft and the filler and catalyst can be uniformly blended to form the composition. The problem is apparent. The catalysts, for curing the resin when heated, are to be mixed into hot resin to obtain a uniform blend. A solution to this problem in the past was to dissolve the resin in a solvent to permit adequate blending of the ingredients without heating them. However, many applications are not suitable for compositions which use solvents. Also, solvent, particularly many organic solvents, are undesirable from an environmental standpoint. For those situations which require a solventless silicone resin molding composition, a catalyst with unique properties is required, namely one which will permit the silicone resin to be blended with the catalyst and filler while the silicone resin is heated, but will not cause the silicone resin to cure until it is used in the molding process.

It has been known for some time that lead salts of carboxylic acids are good catalysts for siloxane resins. This is especially true for siloxane resins which are used in solvent. In this situation, the siloxane resin can be put into a solvent at room temperature and the catalyst and filler can then be mixed with it. However, attempts to use these lead catalysts in solvent free silicone molding compounds have been unsuccessful because they cause gelation during the mixing process because of the heat.

In addition, lead catalysts are not desirable for use in transfer molding because they often gel between the pot and the mold. This causes insufficient flow and prevents satisfactory moldings from being formed. Even in those situations where partial gelling occurs at certain points of the transfer, gel particles can cause poor molded articles and non-uniform products.

From U.S. Pat. No. 3,208,961, issued Sept. 28, 1965, I found that combinations of lead monoxide or lead carbonate with either carboxylic acid or ammonium salts of carboxylic acids could be used as a catalyst for phenyl-containing silicone resin molding compositions where they could be prepared by hot mixing the resin, filler, and catalyst, still have sufficient flow for use in transfer molding, and would cure rapidly in the mold to give a hard molded article. However, lead catalysts cannot be used in some transfer molding processes. Additionally, many of the lead salts are environmentally toxic which is a disadvantage.

In the science of producing investment casting cores by the transfer molding process, using compositions containing silicone resins and oxide fillers, such as fused silica, alumina, and zirconia, as well as, pigments and processing aids, lead and other heavy metal compounds can not be used as catalysts. Lead compounds in the final fired core may react with the casting metal to cause flaws in the final casting. The silicone resins normally used in these compositions are solid at room temperature and contain predominantly reactive hydroxyl groups on silicon, however, some alkoxy groups on silicon may also be present. Condensation of these groups in the presence of a catalyst causes the composition to cure to a rigid thermoset condition.

SUMMARY OF THE INVENTION

An object of this invention is to provide a catalyzed siloxane resin molding composition which can be prepared by hot mixing a siloxane resin, filler, and catalyst without the use of solvent, which has sufficient flow for use in transfer molding, which cures rapidly in the mold to give a hard molded article, and which is free of heavy metals.

This invention relates to a silicone resin composition comprising (A) a siloxane resin having an R:Si ratio of 1:1 to 1.7:1, where R is a radical selected from the group consisting of monovalent hydrocarbon radicals and monovalent halogenated hydrocarbon radicals, and the siloxane resin containing at least 0.25 percent by weight of silicon-bonded hydroxyl groups, (B) a filler, and (C) a catalytic amount of an alkali metal salt selected from the group consisting of an alkali metal carbonate plus a carboxylic acid, an alkali metal bicarbonate plus a carboxylic acid, an alkali metal carbonate plus an ammonium salt of a carboxylic acid, an alkali metal bicarbonate plus an ammonium salt of a carboxylic acid, an alkali metal salt of a carboxylic acid, and mixtures thereof.

DETAILED DESCRIPTION OF THE PREFERRED EMBODIMENTS

Certain catalysts were discovered which can be used in producing investment casting cores by the transfer molding process and which do not contain heavy metals. The alkali metal carbonates and bicarbonates in combination with carboxylic acids or ammonium salts of carboxylic acid can be used in the compositions of this invention. Also alkali metal salts of carboxylic acids can be used per se. Preferred catalysts of this invention are those where the carboxylic acid is benzoic acid or ammonium benzoate in combination with an alkali metal carbonate or bicarbonate, or an alkali metal benzoate per se. The catalysts of this invention can be used in very small amounts such as from about 0.04 weight percent based on the weight of the total composition. Using these catalysts, the compositions of this invention can be easily prepared, have adequate flow for filling core body molds, and exhibit rapid cure in the mold without the use of heavy metals. Compositions containing only the carbonates or bicarbonates do not cure quickly enough.

The amount of catalyst used in the compositions of this invention can be from 0.04 weight percent based on the total weight of the composition. The optimum amount depends upon the resin activity and processing conditions sought. If one is seeking a short flow, rapid cure end product, a choice can be made between using a small amount of a very reactive catalyst with limited process time or a less reactive catalyst which will allow for a longer processing time. Usually one strives for a product which will yield the desired flow characteristics having the shortest possible molding time with the shortest practical manufacturing process. Good results were achieved with amounts from 0.04 weight percent potassium benzoate based on the total weight of the composition, but even lower amounts can be used if increased processing time can be tolerated. The reactivity of the siloxane resin and the effect the alkali metal catalyst may have on the final molded product, in use, can dictate the amount of catalyst tolerated. A practical range of catalyst can be from 0.04 to 1 weight percent based on the total weight of the composition. The preferred amount of catalyst is from 0.04 to 0.4 weight percent based on the total weight of the composition.

The optimum amount of catalyst is dependent upon the characteristics desired in the processing of the composition, flow properties, cure properties, also the nature of the siloxane resin and filler can influence the amount of catalyst which is optimum.

The effectiveness of these catalysts results from their ability to be dispersed adequately throughout the composition even when the amounts are very small. The fineness of the catalyst particles used in making the compositions of this invention is important to the effectiveness of the catalyst. Fine particles are more effective than coarser particles. It is preferred that the size of the particles range from about 1 to 200 microns, preferably from 1 to 20 microns. A very effective method of incorporating the catalyst into the composition is to disperse it on a carrier, such as a filler. Very small amounts of catalyst can be used when it is disperse on a carrier. One method of dispersing the catalyst on a carrier is to dissolve the catalyst in water devoid of heavy metals and then wet out a quantity of filler with it, evaporate the water by heating, and then recovering a filler carrying the catalyst dispersed on its surface. Other solvents might be used if the catalyst is soluble in them.

The alkali metals of the carbonate or bicarbonate salts can be for example, lithium, sodium, or potassium. The carbonate and bicarbonate salts can be illustrated by sodium carbonate, sodium bicarbonate, potassium carbonate, potassium bicarbonate, lithium carbonate, and lithium bicarbonate.

Any carboxylic acid can be used in the catalysts combination of this invention or in the form of the various salts (as the carboxylate). Examples include acetic acid, linoleic acid, stearic acid, benzoic acid, naphthenic acid, oleic acid, butyric acid, lauric acid, octanoic acid, 2-ethylhexanoic acid, and palmitic acid.

The ammonium salts of the carboxylic acid used in this invention can be illustrated by ammonium acetate, ammonium laurate, ammonium oleate, ammonium palmitate, ammonium benzoate, and ammonium stearate.

The catalyst, whether a combination of two or more of the defined compounds or a single alkali metal carboxylate, preferably contains from 0.5:1 to 1:1 mole of alkali metal ion per mole of carboxyl group (either as carboxylic acid or the carboxylate ion). The amounts of the ingredients in the catalyst combinations useful in the compositions of this invention will vary with the particular siloxane resin, filler, and use to which the molding composition is put, including the molding process.

The combinations of catalyst can be illustrated as follows: alkali metal carbonate and carboxylic acid, for example sodium carbonate and benzoic acid, potassium carbonate and benzoic acid, lithium carbonate and benzoic acid, sodium carbonate and acetic acid, potassium carbonate and stearic acid, and lithium carbonate and palmitic acid; alkali metal bicarbonate, for example potassium bicarbonate and benzoic acid, sodium bicarbonate and benzoic acid, lithium bicarbonate and benzoic acid, potassium bicarbonate and stearic acid, lithium bicarbonate and acetic acid, sodium bicarbonate and octanoic acid, and sodium bicarbonate and 2-ethylhexanoic acid; alkali metal carbonate and ammonium carboxylate, for example sodium carbonate and ammonium acetate, potassium carbonate and ammonium benzoate, lithium carbonate and ammonium acetate, sodium carbonate and ammonium stearate, and potassium carbonate and ammonium hexanoate; alkali metal bicarbonate and ammonium carboxylate, for example sodium bicarbonate and ammonium acetate, potassium bicarbonate and ammonium acetate, lithium bicarbonate and ammonium acetate, sodium bicarbonate and ammonium benzoate, lithium bicarbonate and ammonium stearate, and potassium bicarbonate and ammonium oleate; and alkali metal carbonate, alkali metal carboxylate, and ammonium carboxylate, for example lithium acetate, lithium carbonate, and ammonium acetate.

The siloxane resins used in the compositions of this invention are well known materials. These resins are compolymers containing at least two different kinds of siloxane units. The siloxane resin can be represented by the general unit formula

$$R_a SiO_{(4-a-b)/2}^{(OH)_b} \quad (I)$$

in which R is a monovalent hydrocarbon radical or halogenated monovalent hydrocarbon radical, a has an average value of from 1 to 1.7, and b has a value such that there is at least 0.25 weight percent OH group present in the resin. The preferred siloxane resins of this invention have a value of 1.1 to 1.6 for a. The siloxane resin can contain up to several weight percent hydroxyl group, for example about six weight percent OH groups or more, but only the minimum amount of OH groups present is of real importance. In addition to the OH groups the resins can contain some alkoxy groups, such as methoxy, ethoxy, and isopropoxy groups, but the presence of such groups is not essential to the invention, and their presence is often a result of the use of organoalkoxysilanes as starting ingredients or alcohols for the preparation of the resins. The monovalent hydrocarbon radicals can be methyl, phenyl, ethyl, vinyl, propyl, butyl, allyl, cyclohexyl, tolyl, benzyl, and styryl and the halogenated monovalent hydrocarbon radicals can be 3,3,3-trifluoropropyl, gamma-chloropropyl, alpha,alpha,alpha-tolyl, and gamma-(perfluoroethyl)ethyl. The siloxane units can be illustrated by the following $CH_3SiO_{3/2}$, $(CH_3)_2SiO$, $CH_3CH_2SiO_{3/2}$, $(CH_3CH_2)_2SiO$, $C_3H_7SiO_{3/2}$, $(C_3H_7)_2SiO$, $CH_2\!=\!CHSiO_{3/2}$, $(CH_2\!=\!CH)(CH_3)SiO$, $CH_2\!=\!CHCH_2SiO_{3/2}$, $(CF_3CH_2CH_2)(CH_3)SiO$, $ClCH_2CH_2CH_2SiO_{3/2}$, $C_6H_{11}SiO_{3/2}$, $SiO_2$, $(CH_3)_3SiO_{\frac{1}{2}}$, $C_6H_5SiO_{3/2}$, $(C_6H_5)_2SiO$, $(CH_3)(CH_6H_5)SiO$, $(C_2H_5)(C_6H_5)SiO$, $(C_3H_7)(C_6H_5)SiO$, $Cl_2C_6H_3SiO_{3/2}$, $CF_3\!-\!C_6H_4SiO_{3/2}$, $(C_6H_5)(CF_3CH_2CH_2)SiO$, $CH_3\!-\!C_6H_4SiO_{3/2}$, $C_6H_5\!-\!CH_2\!-\!SiO_{3/2}$, $(CH_3)_2(C_6H_5)SiO_{\frac{1}{2}}$, and $CH_2\!=\!CH\!-\!C_6H_5SiO_{3/2}$. Any of the above siloxane units can contain hydroxyl groups, except those which have three groups bonded to the silicon atom through silicon-carbon bonds.

The preferred siloxane resins are the phenylsiloxane resins which are well known materials. These phenylsiloxane resins are copolymers containing at least two different kinds of siloxane units and at least one kind of the units contains a phenyl group. The phenylsiloxane resin can be represented by the general unit formula (I).

The siloxane units containing a phenyl group can be represented by the general unit formula

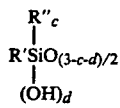
(II)

in which R' of each unit is a phenyl group, for example, phenyl, benzyl, tolyl, alpha, alpha, alpha-trifluorotolyl, styryl, and dichlorophenyl; R" is a phenyl group as defined for R' or an alkyl or halogenated alkyl such as methyl, ethyl, propyl, butyl, cyclohexyl, 3,3,3-trifluoropropyl, gamma-chloropropyl, vinyl, and allyl; c is 0, 1, or 2; and d can be 0, 1, or 2. For example, the phenyl group containing units can be illustrated by $C_6H_5SiO_{3/2}$, $(C_6H_5)_2SiO$, $(CH_3)(C_6H_5)SiO$, $(C_2H_5)(C_6H_5)SiO$, $(C_3H_7)(C_6H_5)SiO$, $Cl_2C_6H_3SiO_{3/2}$, $CF_3—C_6H_4SiO_{3/2}$, $(C_6H_5)(CF_3CH_2CH_2)SiO$, $CH_3—C_6H_4SiO_{3/2}$, $C_6H_5—CH_2—SiO_{3/2}$, $(CH_3)_2(C_6H_5)SiO_{\frac{1}{2}}$, and $CH_2=CH—C_6H_5SiO_{3/2}$. Any of the above phenyl-containing siloxane units can also contain a hydroxyl group, except those which have three groups bonded to the silicon atom through silicon-carbon bonds. The phenylsiloxane resins can also contain non-phenyl siloxane units. Non-phenyl containing siloxane units can be represented by the following units formula

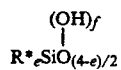

in which R* in each unit can be a non-phenyl monovalent hydrocarbon radical or a non-phenyl halogenated monovalent hydrocarbon radical such as an alkyl or halogenated alkyl such as methyl, ethyl, propyl, butyl, cyclohexyl, 3,3,3-trifluoropropyl, gamma-chloropropyl, vinyl, and allyl; e can be 0, 1, 2, or 3; and f can be 0, 1, or 2. The non-phenyl containing siloxane units can be illustrated by the following units: $CH_3SiO_{3/2}$, $(CH_3)_2SiO$, $CH_3CH_2SiO_{3/2}$, $(CH_3CH_2)_2SiO$, $C_3H_7SiO_{3/2}$, $(C_3H_7)_2SiO$, $CH_2=CHSiO_{3/2}$, $(CH_2=CH)(CH_3)SiO$, $CH_2=CHCH_2SiO_{3/2}$, $(CF_3CH_2CH_2)(CH_3)SiO$, $ClCH_2CH_2CH_2SiO_{3/2}$, $C_6H_{11}SiO_{3/2}$, $SiO_2$ and $(CH_3)_3SiO_{\frac{1}{2}}$. Any of the above non-phenyl containing siloxane units can contain hydroxyl groups, except those which have three groups bonded to the silicon atom through silicon-carbon bonds. The ratio of the phenyl-containing siloxane units and the non-phenyl containing siloxane units making up the phenylsiloxane resin have a phenyl group to silicon atom of 0.3:1 to 0.9:1, preferably from 0.5:1 to 0.7:1. The ratio of non-phenyl groups to silicon atom is from 0.4:1 to 1.2:1, preferably from 0.5:1 to 1:1. The preferred phenylsiloxane resins contain siloxane units which have phenyl and methyl groups.

The filler used in the compositions of this invention can be those particulate fillers which are known in the art for use in silicone resins, especially those used for siloxane resins which are used in the preparation of resins useful in transfer molding. The fillers can be illustrated by glass, diatomaceous earth, crushed quartz, clays, fume silica, precipitated silica, ground fused silica, ground cristobalite silica, zirconium oxide, aluminum oxide, zirconium silicate, magnesium silicate, lithium silicate, aluminum silicate, magnesium oxide, iron oxide, titanium oxide, calcium carbonate, and magnesium carbonate. The amounts of iron oxide, magnesium oxide, titanium dioxide, calcium carbonate, and magnesium carbonate should only be used in very small amounts.

The amount of the filler and resin in the composition is not critical, except that the composition is suitable for transfer molding. The amount of filler can be a small fraction of the amount of resin or the amount of filler can be several times the amount of resin. The relative amounts of resin and filler in the composition is dependent upon the use to which the composition is to be put or the properties desired in an article made from the composition. In the compositions used as transfer molding compositions, the resin can be present in an amount of from 10 to 25 weight percent and the filler can be present in amounts of from 75 to 90 weight percent, where the weight percentages are based on the total weight of the composition.

The compositions of the present invention can be made by mixing the filler and resin and then adding the catalyst where the resin and/or resin-filler combination are heated to permit the uniform mixing of the catalyst into the composition.

In addition to the above ingredients, small amounts of conventional additives can be used. For example, performance additives, such as, flow additives, pigments, and release agents such as calcium stearate, aluminum stearate, or waxes.

The following examples are presented for illustrative purposes and should not be construed as limiting the invention which is properly delineated in the claims. In the following examples, "part" or "parts" are "part by weight" or "parts by weight" respectively, and "percent" is "weight percent."

EXAMPLE 1

Compositions were prepared by mixing the dry ingredients, as shown in Table I, and then milling them on a hot two roll mill where one roll was heated to about 210°F and the other roll was cooled to about 40°F. Milling was continued for periods of time according to the activity of the catalyst and the flow length sought. The times were as shown in Table II. The siloxane resin had the following siloxane unit composition: 45 mole percent $CH_3SiO_{1.5}$ units, 5 mole percent $(C_6H_5)(CH_3)SiO$ units, 40 mole percent $C_6H_5SiO_{1.5}$ units, and 10 mole percent $(C_6H_5)_2SiO$ units. This phenylsiloxane resin had a silicon-bonded hydroxyl content of six percent. The phenylsiloxane resin had a methyl:silicon ratio of 0.5:1, a phenyl:silicon ratio of 0.65:1, and a methyl plus phenyl:silicon ratio of 1.15:1.

TABLE I

| INGREDIENT | COMPOSITION, PARTS | | | | | |
|---|---|---|---|---|---|---|
|  | 1 | 2 | 3 | 4 | 5 | 6 |
| Phenylsiloxane resin | 30.6 | 30.6 | 30.6 | 30.2 | 29.7 | 30.6 |
| Ground fused silica | 55.9 | 56.0 | 56.0 | 56.2 | 56.6 | 56.0 |
| Ground aluminum oxide | 4.17 | 4.18 | 4.18 | 4.20 | 4.22 | 4.18 |
| Ground zirconium oxide | 7.51 | 7.52 | 7.52 | 7.55 | 7.60 | 7.52 |
| Performance additives | 1.67 | 1.67 | 1.67 | 1.68 | 1.69 | 1.67 |
| Sodium carbonate | 0.037 | — | — | — | — | — |
| Potassium carbonate | — | 0.019 | — | — | — | — |
| Potassium bicarbonate | — | — | — | 0.037 | — | — |
| Sodium bicarbonate | — | — | — | — | 0.075 | — |
| Lithium carbonate | — | — | — | — | — | 0.037 |
| Benzoic acid | 0.112 | 0.037 | — | 0.073 | 0.131 | — |
| Ammonium acetate | — | — | — | — | — | 0.077 |
| Lithium stearate | — | — | 0.063 | — | — | — |

The compositions described by Table I were evaluated by molding a spiral flow specimen. This evaluation indicated how far a material would flow under heat and pressure before the resin gelled and therefore simulated the use of the compositions to transfer molding processes. A 15 gram sample of composition in the form of a one inch diameter slug was used. The molding teperature was maintained at 175° C. and the transfer pressure was 1000 psi. In most instances, the molded specimen was evaluated after two minutes, but in those cases where the molding was not as good as desired at the two minute time, longer molding times were used. In most cases where the flow length exceeded 10-12 inches, mold times longer than two minutes were necessary to achieve a well molded specimen. Each of the above six compositions resulted in spiral moldings which were blister free and firm.

TABLE II

| COMPOSITION NO. | MILLING TIME MINUTES | SPIRAL FLOW MOLD TIME MINUTES | FLOW LENGTH INCHES |
| --- | --- | --- | --- |
| 1 | 20 | 2 | 11.75 |
| 2 | 12 | 2 | 10 |
| 3 | 10 | 2 | 8 |
| 4 | 10 | 2 | 8 |
| 5 | 10 | 2 | 6.5 |
| 6 | 10 | 4 | 12 |

EXAMPLE 2

Catalysts were prepared on a carrier. A filler mixture was prepared by blending 50 parts of ground fused silica, about 8 parts of ground cristobalite silica, and about 25 parts of ground zirconium oxide This filler mixture was used as a carrier for the catalyst. 33.3 parts of a 30 percent solution of sodium benzoate in deionized water was used to wet out 90 parts of the filler mixture by mixing in a Kitchen Aid mixer. The wet out mixture was then dried while mixing to the point where liquid-solid separation would not take place. The damp mixture was then dried in an air circulating oven at 110° C. for two hours. The resulting product was about 10 percent sodium benzoate on a filler mixture (Catalyst/carrier A). A second catalyst on a carrier was prepared as describe above, except potassium benzoate was used in place of the sodium benzoate. This second catalyst is hereinafter referred to as Catalyst/carrier B and was about 10 percent potassium benzoate.

A filler-resin composition was prepared by milling as described in Example 1, except the ingredients were about 50 parts of ground fused silica, about 8 parts of ground cristobalite silica, about 25 parts of ground zirconium oxide, about 15 parts of the phenylsiloxane resin described in Example 1, and two parts of performance additives.

794 parts of the filler-resin composition and 6 parts of Catalyst/carrier A were mixed using the procedure as described in Example 1. This composition was evaluated by molding a spiral flow specimen as described in Example 1. The milling time was 6 minutes, the spiral flow mold time was two minutes, the flow length was 6.25 inches, and the specimen was blister free and firm.

796.25 parts of the filler-resin composition and 3.75 parts of Catalyst/carrier B was mixed using the procedure as described in Example 1. This composition was evaluated by molding a spiral flow specimen as described in Example 1. The milling time was five minutes, the spiral flow mold time was two minutes, the flow length was six inches, and the specimen was blister free and firm.

EXAMPLE 3

A composition was prepared as described in Example 1 where 800 parts of the filler-resin composition, 0.41 part of lithium acetate dihydrate, 0.15 part of lithium carbonate, and 0.31 ammonium acetate were used. This composition was evaluated by molding a spiral flow specimen as described in Example 1. The milling time was six minutes, the spiral flow mold time was two minutes, the flow length was 12 inches, and the molded specimen was blister free and firm.

EXAMPLE 4

A mixture of 400 parts of a filler-resin composition similar to the one described in Example 2 and 0.2 part of ground potassium bicarbonate was prepared by milling on a hot two roll mill for 6.5 minutes. A piece of the milled product was placed on a 175° C. platen to cure. Very little, if any, cure was observed in 10 minutes. The sample was returned to the mill and another 0.2 part of ground potassium bicarbonate was added and the mixture was milled for an additional five minutes. A spiral flow was determined on a sample of the material and a flow length of 9.5 inches was observed. The cure after two minutes of molding was very poor.

The remaining sample was placed back on the hot mill where 0.6 part of benzoic acid was added and the mixture was milled for an additional 1.5 minutes. Its spiral flow was determined and found to be one inch or less of flow with the cure being very good after two minutes. This evaluation illustrated the effect of combining potassium bicarbonate and benzoic acid as a catalyst for use in transfer molding of phenylsiloxane resins.

EXAMPLE 5

A mixture of 400 parts of a filler-resin composition similar to the one described in Example 2, 0.4 part of ground potassium bicarbonate, and 0.6 part of benzoic acid was prepared by milling on a hot two roll mill for four minutes. This composition was evaluate as described in Example 1 using a spiral flow molding process. The flow length was five inches which is often too short for many applications and was considered too short to be practical.

EXAMPLE 6

A mixture of 400 parts of a filler-resin composition similar to the one described in Example 2, 0.2 part of ground potassium bicarbonate, and 0.3 part of benzoic acid was prepared by milling on a hot two roll mill for three minutes. This composition was evaluated as described in Example 1 using a spiral flow molding process. The flow length was 8.5 inches with a flow duration of 13 seconds. The molded spiral sample was blister free after molding for two minutes. This example illustrates the effectiveness of small amounts of the catalyst combination of benzoic acid and potassium bicarbonate.

That which is claimed is:

1. A silicone resin composition comprising (A) a siloxane resin having an R:Si ratio of 1:1 to 1.7:1, where R is a radical selected from the group consisting of monovalent hydrocarbon radicals and monovalent halogenated hydrocarbon radicals, and the siloxane resin containing at least 0.25 percent by weight of silicon-bonded hydroxyl groups, (B) a filler, and (C) a catalytic amount of an alkali metal salt selected from the group consisting of an alkali metal carbonate plus a carboxylic acid, an alkali metal bicarbonate plus a carboxylic acid, an alkali metal carbonate plus an ammonium salt of a carboxylic acid, an alkali metal bicarbonate plus an ammonium salt of a carboxylic acid, an alkali metal salt of a carboxylic acid, and mixtures thereof.

2. The silicone resin composition according to claim 1 in which the siloxane resin of (A) is a phenylsiloxane resin having a $C_6H_5$:Si ratio of 0.3:1 to 0.9:1, an $R^*$:Si ratio of 0.4:1 to 1.2:1 where $R^*$ is a non-phenyl radical selected from the group consisting of monovalent hydrocarbon radicals and monovalent halogenated hydrocarbon radicals, a total $C_6H_5$ plus $R^*$:Si ratio of 1:1 to 1.7:1, and containg at least 0.25 percent by weight of silicon-bonded hydroxyl groups.

3. The silicone resin composition according to claim 2 in which the catalytic amount of catalyst (C) is from 0.04 to 1 weight percent based on the total weight of the composition.

4. The silicone resin composition according to claim 2 in which the alkali metal salt includes alkali metal ion and carboxyl group in a ratio such that there is 0.5:1 to 1:1 alkali metal ion per carboxyl group.

5. The silicone resin composition according to claim 3 in which the alkali metal salt includes alkali metal ion and carboxyl group in a ratio such that there is 0.5:1 to 1:1 alkali metal ion per carboxyl group.

6. The silicone resin composition according to claim 2 in which the phenylsiloxane resin has a $C_6H_5$:Si ratio of 0.5:1 to 0.7:1, an $R^*$:Si ratio of 0.5:1 to 1:1, a $C_6H_5$ plus $R^*$:Si ratio of 1.1:1 to 1.6:1, and a hydroxyl content of 0.25 to 6 weight percent.

7. The silicone resin composition according to claim 3 in which the phenylsiloxane resin has a $C_6H_5$:Si ratio of 0.5:1 to 0.7:1, an $R^*$:Si ratio of 0.5:1 to 1:1, a $C_6H_5$ plus $R^*$:Si ratio of 1.1:1 to 1.6:1, and a hydroxyl content of 0.25 to 6 weight percent.

8. The silicone resin composition according to claim 4 in which the phenylsiloxane resin has a $C_6H_5$:Si ratio of 0.5:1 to 0.7:1, an $R^*$:Si ratio of 0.51 to 1:1, a $C_6H_5$ plus $R^*$:Si ratio of 1.1:1 to 1.6:1, and a hydroxyl content of 0.25 to 6 weight percent.

9. The silicone resin composition according to claim 5 in which the phenylsiloxane resin has a $C_6H_5$:Si ratio of 0.5:1 to 0.7:1, an $R^*$:Si ratio of 0.5:1 to 1:1, $C_6H_5$ plus $R^*$:Si ratio of 1.1:1 to 1.6:1, and hydroxyl content of 0.25 to 6 weight percent.

10. The silicone resin composition according to claim 2 in which the catalyst of (C) is alkali metal carbonate plus carboxylic acid.

11. The silicone resin composition according to claim 10 in which the alkali metal carbonate is sodium carbonate and the carboxylic acid is benzoic acid.

12. The silicone resin composition according to claim 10 in which the alkali metal carbonate is potassium carbonate and the carboxylic acid is benzoic acid.

13. The silicone resin composition according to claim 2 in which the catalyst (C) is alkali metal bicarbonate plus carboxylic acid.

14. The silicone resin composition according to claim 13 in which the alkali metal bicarbonate is potassium bicarbonate and the carboxylic acid is benzoic acid.

15. The silicone resin composition according to claim 13 in which the alkali metal bicarbonate is sodium bicarbonate and the carboxylic acid is benzoic acid.

16. The silicone resin composition according to claim 2 in which the catalyst (C) is alkali metal carbonate plus an ammonium salt of a carboxylic acid.

17. The silicone resin composition according to claim 16 in which the alkali metal carbonate is lithium carbonate and the ammonium salt of carboxylic acid is ammonium acetate.

18. The silicone resin composition according to claim 2 in which the catalyst (C) is an alkali metal salt of a carboxylic acid.

19. The silicone resin composition according to claim 18 in which the alkali metal salt of the carboxylic acid is lithium stearate.

20. The silicone resin composition according to claim 2 in which the catalyst (C) is a mixture of an alkali metal carbonate, an alkali metal salt of a carboxylic acid, and an ammonium salt of a carboxylic acid.

21. The silicone resin composition according to claim 20 in which the alkali metal carbonate is lithium carbonate, the alkali metal salt of the carboxylic acid is lithium acetate, and the ammonium salt of the carboxylic acid is ammonium acetate.

22. The silicone resin composition according to claim 2 in which the catalyst of (C) is on a carrier.

23. The silicone resin composition according to claim 22 in which the catalyst of (C) is an alkali metal salt of a carboxylic acid.

24. The silicone resin composition according to claim 23 in which the alkali metal salt of the carboxylic acid is sodium benzoate.

25. The silicone resin composition according to claim 23 in which the alkali metal salt of the carboxylic acid is potassium benzoate.

* * * * *